Aug. 12, 1924.  
C. S. ALIG  
1,504,305  
COMBINATION WARM AIR FURNACE AND KITCHEN RANGE  
Filed Nov. 14, 1922   2 Sheets-Sheet 2
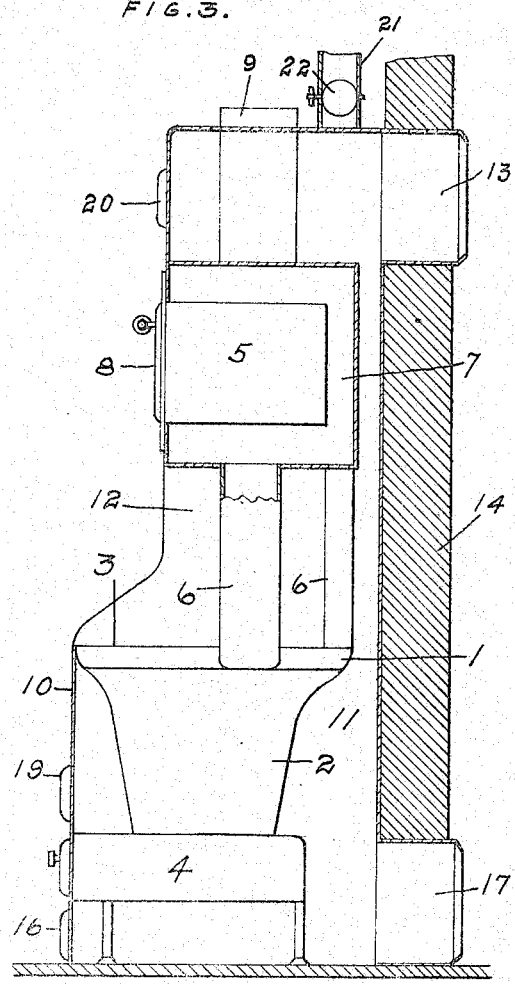
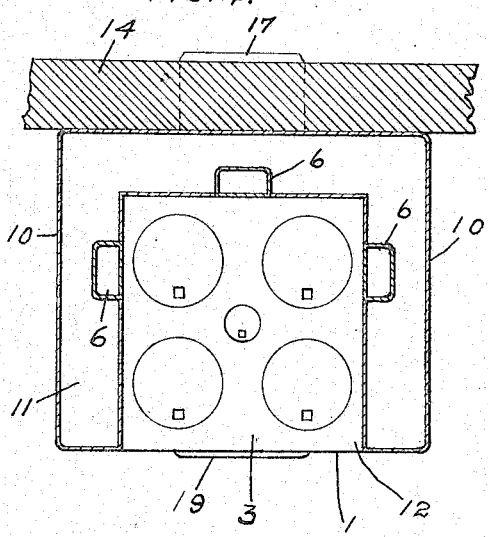
INVENTOR
CLARENCE S. ALIG
BY
ATTORNEY Patented Aug. 12, 1924.

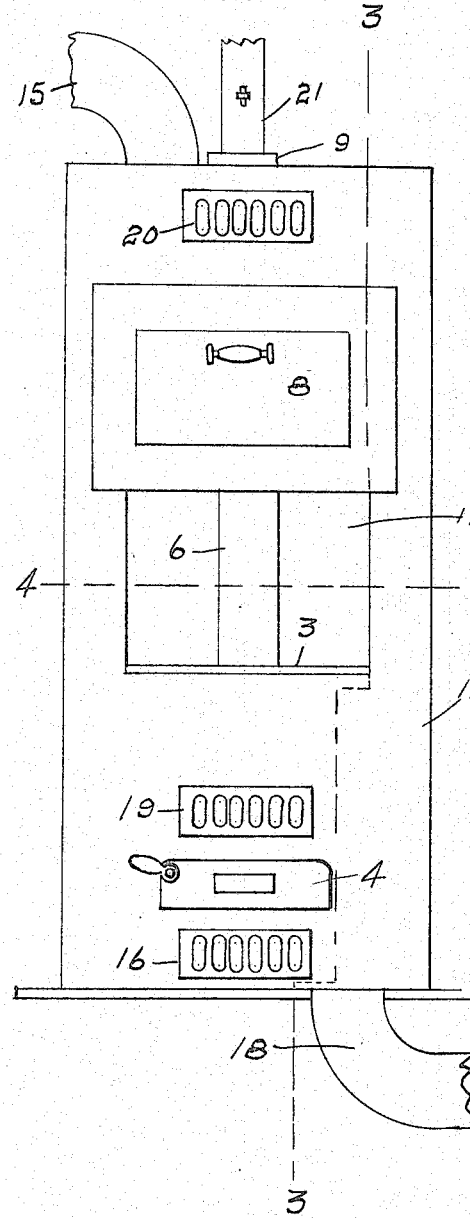
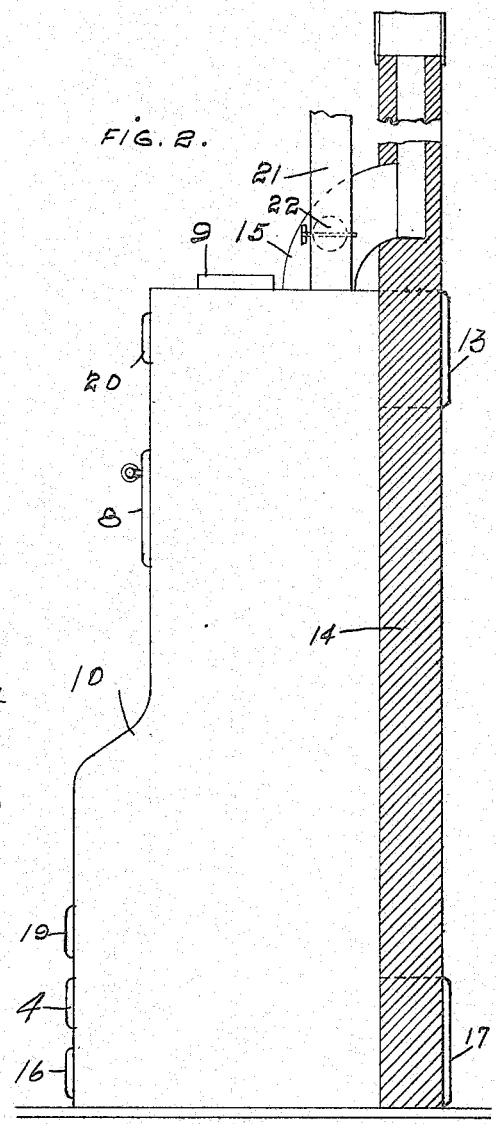

1,504,305

UNITED STATES PATENT OFFICE.

CLARENCE S. ALIG, OF INDIANAPOLIS, INDIANA.

COMBINATION WARM-AIR FURNACE AND KITCHEN RANGE.

Application filed November 14, 1922. Serial No. 600,932.

*To all whom it may concern:*

Be it known that I, CLARENCE S. ALIG, a citizen of the United States, residing at Indianapolis, in the county of Marion and State of Indiana, have invented certain new and useful Improvements in Combination Warm-Air Furnaces and Kitchen Ranges, of which the following is a specification.

This invention relates to a combined warm air furnace and kitchen range, and the prime feature of the invention is the provision of means for employing the heat from the range for heating air to be distributed through dwellings or other buildings.

A further feature of the invention is the provision of means for conducting the heated air to various rooms or compartments as may be desired.

A further feature of the invention is the provision of means for regulating the degree to which the air may be heated.

A further feature of the invention is the provision of means for causing air to travel around and in proximity to the fire bowl of the range.

And a further feature of the invention is the provision of means for controlling and carrying off the heated air when such heat is not needed for heating purposes.

Other objects and advantages will be hereinafter more fully set forth and pointed out in the accompanying specification.

In the accompanying drawings,

Figure 1 is a front view of the combined warm air furnace and kitchen range,

Figure 2 is a side elevation thereof,

Figure 3 is a vertical sectional view as seen on line 3—3, Figure 1, and

Figure 4 is a horizontal sectional view as seen on line 4—4, Figure 1.

Referring to the drawings, 1 indicates a kitchen range preferably of the high oven type comprising a fire bowl 2 having a cooking top 3 at its upper end and an ash pit 4 at its lower end. Positioned a distance above the cooking top 3 is an oven 5, said oven being supported in any suitable manner and connected with the fire bowl 2 by pipes or flues 6, a flue being preferably positioned at each end of the cooking top and at the rear thereof.

A passage 7 is formed around the entire oven 5 with the exception of the front face thereof so as to thoroughly heat the contents of the oven, the front face of the oven having the usual form of door or closure 8. The products of combustion are conveyed from the passage 7 into the ordinary chimney (not shown) through a smoke outlet 9. These features are of the ordinary or well-known construction, but in order to utilize the heat for the dual purpose of cooking and heating a dwelling, a casing 10, preferably of metal, is placed around the range 1 and the oven 5 and spaced therefrom to form an air chamber 11, the casing 10 having an opening 12 in its front face so that access may be had to the cooking top 3 and the oven 5, while the remainder of the range is entirely enclosed by the casing.

In the event that the heating construction is to be used as a pipeless furnace an outlet 13 is formed at the upper end of the casing 10 and is preferably extended through a partition wall 14 into an adjacent room of the building, but in addition to the outlet 13 one or more hot air pipes 15, as best shown in Figure 1 of the drawings, may be attached to the casing 10 and extended to any room or rooms of the building at a distance from the heating element. The cold air may be inducted into the casing 10 around the fire bowl 2 in any suitable manner as by placing a sliding grill 16 in the front face of the casing adjacent its lower end or through cold air inlets 17, such as shown in Figure 3 may be formed through the wall 14 at the lower end of the casing 10 or through a pipe 18 as shown in Figure 1 of the drawings, and if desired said pipe may be extended to a distant part of the building being heated. In addition to the grill 16 an additional grill 19 is preferably located above the ash pit 4 so that air may be entered forwardly of the fire bowl thereby insuring that the air will circulate entirely around the fire bowl. In the event the heat arising from the cooking top is not sufficient to properly heat the room in which the heating element is located, a sliding grill 20 is positioned adjacent the upper end of the casing 10 and above the oven 5 so that by opening the grill 20 heated air may be discharged into the room in which the heating element is located.

In the event the heated air is not required for heating purposes, as during the warm or summer months, an exhaust pipe 21 is connected to the upper end of the casing 10 and is extended to any suitable point for discharging the heated air to the outer atmosphere, said exhaust pipe having a damper 22 therein which will regulate the passage of the heated air through the exhaust pipe. When the heated air is to be discharged through the exhaust pipe 21, the damper 22 is opened, and the outlet 13, pipe 15 and grill 20 closed, consequently the air heated within the casing 10 will be carried off through the exhaust 21.

As previously stated, the prime object of this invention is the employment or utilization of the heat generated from a cooking range for heating parts or all of a dwelling or other building, which heat would otherwise be more or less wasted, and by encasing the range as shown, the air passing through the casing will be thoroughly heated and successfully used for heating the rooms of the building.

It will likewise be seen that in view of the simplicity of the improved elements in connection with the range, the same may be cheaply manufactured and readily installed for use, the heat generated being sufficient to properly heat a dwelling of moderate proportions under most weather conditions, thereby entailing a large saving in the cost of fuel.

It will furthermore be understood that any suitable fuel may be used in the range, such as coal, gas, coke, wood or oil without necessitating any particular changes in any of the parts of the heating element.

Having thus fully described my said invention, what I claim as new and desire to secure by Letters Patent, is:

1. A combined furnace and range comprising a fire pot and a cooking top, an oven spaced above said cooking top, a casing surrounding said oven and having its walls spaced therefrom, a smoke pipe at the rear and on each side forming communication between the fire pot and the oven casing, a main casing having a lower portion surrounding the fire pot and an upper portion surrounding the oven casing said main casing having a double walled intermediate portion inclosing said cooking top on three sides and formed integrally with and inclosing said smoke pipes, substantially as set forth.

2. A combined furnace and range comprising a main casing having upper and lower sections and a double walled intermediate portion joining said upper and lower sections on three sides, a fire pot in the lower section spaced above the bottom of the main casing and having a cooking top located between the three walls of the intermediate portion and forming the top of the lower section, a cube shaped oven casing in the upper section having its front wall integral with the front of the main casing and its rear wall spaced inwardly from the rear wall of the main casing, an oven in the oven casing having its walls spaced from the walls of the casing and having a door adapted to close the opening in the main casing, a flue formed integrally with each side of the intermediate portion and projecting into the space between the side walls thereof and forming communication between the fire pot and the oven casing, substantially as set forth.

3. A combined furnace and cook stove comprising a main casing having upper and lower sections and a double walled intermediate portion joining said upper and lower sections on three sides, an inlet for conveying unheated air into the lower portion of said casing, an outlet for heated air at the upper end of said casing, an exhaust pipe at the upper end of said casing for discharging the heated air within the casing into the outer atmosphere, means for controlling the discharge of the heated air through said exhaust pipe, an ash pit and fire pot in the lower section spaced above the bottom of the main casing, said fire pot having a cooking top located between the three walls of the intermediate portion and forming the top of the lower section, a cube shaped oven casing in the upper section having its front wall integral with the front of the main casing and its rear wall spaced inwardly from the rear wall of the main casing, an oven in the oven casing with its side and end walls spaced from the side and end walls of the oven casing, said oven having a door adapted to close the opening in the main casing, flues having walls integral with the walls of the intermediate casing and projecting into the space between the inner and outer walls thereof and forming communication between the fire pot and the oven casing, and a smoke pipe extending from the upper wall of the oven casing through the top of the main casing, substantially as set forth.

In witness whereof, I have hereunto set my hand and seal at Indianapolis, Indiana, this 27th day of October, A. D. nineteen hundred and twenty-two.

CLARENCE S. ALIG. [L. S.]

Witnesses:
M. L. SHULER,
CAREY S. FRYE.